UNITED STATES PATENT OFFICE.

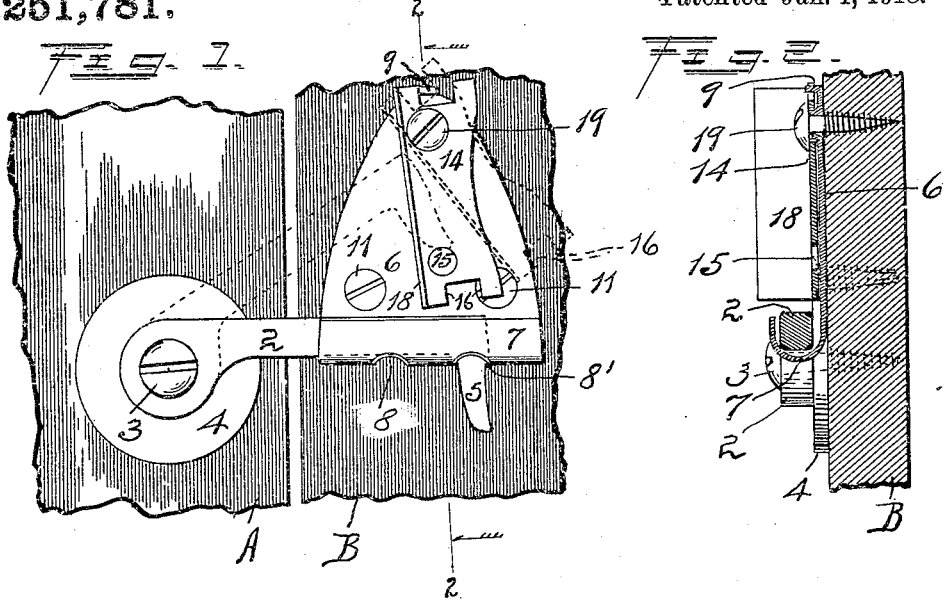
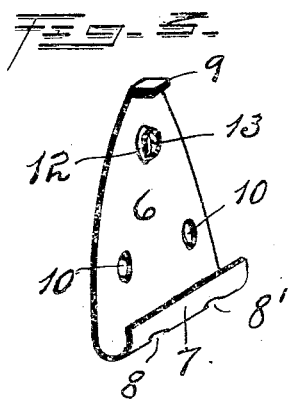
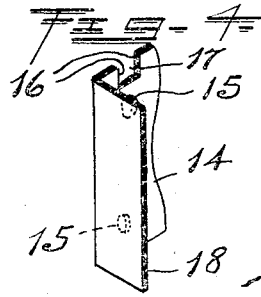
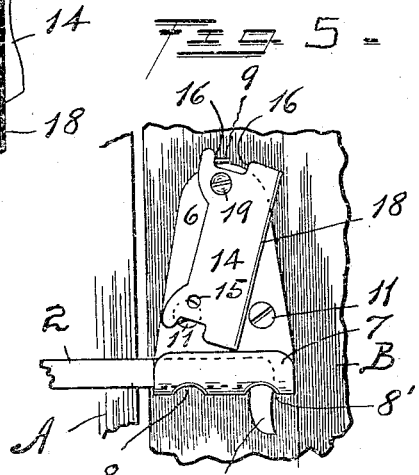

PERRY C. JAMES, OF MACOMB, ILLINOIS, ASSIGNOR TO GEORGE G. BAYNE, OF BUSHNELL, ILLINOIS.

LATCH.

1,251,781.  Specification of Letters Patent.  Patented Jan. 1, 1918.

Application filed January 24, 1917. Serial No. 144,164.

*To all whom it may concern:*

Be it known that I, PERRY C. JAMES, formerly of Sciota, McDonough county, Illinois, but now of Macomb, in said county and State, have invented a new and useful Latch, of which the following is a specification.

My present invention relates to latches in which a swinging hook or the like, secured on a gate, door, or other object, is adapted to engage a keeper secured on the stationary part of the structure.

One of the objects of the invention is to provide a keeper and hook-lock which are adapted as either "rights" or "lefts," whereby to be engaged by a hook secured at either side thereof.

Another object is to provide a hook-lock which is displaced in the act of engaging the hook with the keeper and which automatically swings back (by its own gravity) and locks the hook in engagement with the keeper. It will be evident, as the nature of the invention is more fully disclosed, that a latch thus constructed is inoperable by an animal (stock) even though it has access thereto, for in order to release the hook both the hook and the lock must be operated simultaneously.

It may be said, therefore, that the principal object of the invention is to generally improve the construction and increase the capacity, utility and efficiency of devices of this character.

The nature of the invention is such that it will be readily understood by reference to the accompanying drawings and the following description, but it must be understood that the drawings show and the description sets forth only those embodiments which I at present prefer, and that the details are subject to much modification without departing from the principles and novel features of the invention defined in the claims.

In the drawings above referred to:

Figure 1 is a front elevation of the preferred structural form of my improvements, shown as assembled and in operative position upon a fragment of a door and door-casing;

Fig. 2, a vertical section, its plane taken in the line 2—2 in Fig. 1;

Fig. 3, a perspective detail of the keeper;

Fig. 4, a similar view of the hook-lock; and

Fig. 5, a front elevation of the preferred form and assemblage of the elements shown in Fig. 1, it being noted that the only change is that the latch-lock is reversed.

Coming now to a detailed description of the drawings, A denotes a fragment of a door and B a fragment of a casing.

2 indicates a hook secured in an ordinary manner, by means of a screw 3 and washer 4 upon the door and adapted to swing in the manner indicated by the dotted lines, the hook-terminal being indicated by 5.

6 denotes a keeper the lower portion 7 of which is formed into U-shape and provided with apertures 8, 8'. The body is substantially triangular in outline and has at its apex an outwardly projecting detent-tongue 9. 10, 10 indicate apertures for the reception of the securing-screws 11, and 12 denotes an embossment having an eye 13.

14 denotes a gravity lock or locking-dog having near each of its ends an aperture 15 preferably offset from the longitudinal central line, and having at each of its ends a pair of opposed shoulders 16 affording a notch 17. 18 indicates an operating-lip standing substantially at a right angle to the plane of the body. Either eye 15 of the lock may be positioned over the boss 12, which serves as a journal therefor, and is secured in position by a screw 19 which passes through said eye and through the one in said boss.

Attention is called to the fact that while in the assemblage shown in Fig. 1 the hook-point 5 will strike the relatively outer face of the lip 18, in the assemblage shown in Fig. 5 it will strike the opposite (or relatively inner) face thereof.

See Fig. 1. To unfasten or disengage the hook 2 from the keeper the operator must first swing the lock 14 to the dotted line position therein shown, and then lift the hook. To again engage the hook with the keeper he need not touch the lock, but will swing the hook in the usual manner, whereupon its free end will strike the operating lip 18 and drive the lock substantially to the dotted line position shown in said figure. When the hook has passed into engagement with the aperture 8' it will have freed itself from contact with the lock and the latter will then swing by its own gravity back into normal position, in which the lip 18 rests transversely across the hook and prevents it from being raised until the lock is again swung.

Now assume the elements which are secured to the casing B to be as shown in said figure, but the door A and hook B at the right thereof. The hook in swinging would strike the inner face of the lip or flange 18 and move it in the opposite direction, and as soon as the hook is in engaged position the lock will swing back over it. In this position the hook-terminal 5 will be engaged with the aperture 8. In view of the showing in Fig. 5 it is entirely unnecessary to encumber the drawing with additional views showing the slight assemblage-change just described, and the description last above will be sufficient to make clear the operation of the structure and assemblage shown in Fig. 5 except to add that in said figure the other end of the lock is the hinged end. It is to be noted that the hook-terminal 5 is to be engaged with the distant one of the apertures 8 or 8', and further that the shoulders 16 and tongue 9 prevent undue movement of the lock 14.

Having thus described the nature of the invention I claim as new the following, to wit:

1. In a latch, a keeper having a substantially U-shaped lower portion provided with apertures arranged one near each of its ends, a hook the free end of which is adapted to be directed toward either side of said keeper and to selectively engage the distant one of said apertures, accordingly as it is hung, and a swinging hook-locking dog having a locking portion arranged to lie normally above said hook and at a point intermediate said apertures.

2. In a latch, a keeper having at its upper end a detent, a hook adapted to engage the keeper, and a reversible gravity-returned locking-dog either end of which is adapted for hinge-connection with said keeper, said dog provided at each of its ends with shoulders adapted to strike said detent, accordingly as its upper or lower end is connected to the keeper, said dog having an outstanding branch adapted to be struck by the hook as it assumes the operative position, whereby to temporarily displace the dog.

In testimony whereof I hereunto subscribe my name this 18th day of January, 1917.

PERRY C. JAMES.

Copies of this patent may be obtained for five cents each, by addressing the "Commissioner of Patents, Washington, D. C."